(12) United States Patent
Holm et al.

(10) Patent No.: US 7,000,045 B2
(45) Date of Patent: Feb. 14, 2006

(54) BYTE-ENABLED TRANSFER FOR A DATA BUS HAVING FIXED-BYTE DATA TRANSFER

(75) Inventors: Jeffrey J. Holm, Eden Prairie, MN (US); Steven M. Emerson, Chanhassen, MN (US); Matthew D. Kirkwood, West St. Paul, MN (US)

(73) Assignee: LSI Logic Corporation, Milpitas, CA (US)

( * ) Notice: Subject to any disclaimer, the term of this patent is extended or adjusted under 35 U.S.C. 154(b) by 481 days.

(21) Appl. No.: 10/229,745

(22) Filed: Aug. 28, 2002

(65) Prior Publication Data

US 2004/0044812 A1  Mar. 4, 2004

(51) Int. Cl.
*G06F 13/00* (2006.01)
*G06F 13/14* (2006.01)

(52) U.S. Cl. .................... 710/110; 710/305
(58) Field of Classification Search ........... 710/107, 710/110, 305, 306, 307, 316, 22, 34, 66, 74; 711/168, 202; 712/210; 713/200; 345/522; 370/362
See application file for complete search history.

(56) References Cited

U.S. PATENT DOCUMENTS

| | | | | |
|---|---|---|---|---|
| 4,447,878 A | * | 5/1984 | Kinnie et al. | 710/307 |
| 4,633,437 A | * | 12/1986 | Mothersole et al. | 710/74 |
| 4,649,477 A | * | 3/1987 | MacGregor et al. | 712/210 |
| 5,129,062 A | * | 7/1992 | Gygi et al. | 710/34 |
| 5,265,228 A | * | 11/1993 | Beaudoin et al. | 710/306 |
| 5,274,780 A | * | 12/1993 | Nakao | 710/107 |
| 5,392,406 A | * | 2/1995 | Petersen et al. | 710/316 |
| 5,519,842 A | * | 5/1996 | Atallah et al. | 711/202 |
| 5,805,843 A | * | 9/1998 | Gehlhaar | 710/305 |
| 5,928,346 A | * | 7/1999 | Johnson et al. | 710/110 |
| 6,122,696 A | * | 9/2000 | Brown et al. | 710/307 |
| 6,233,632 B1 | * | 5/2001 | Meiyappan et al. | 710/66 |
| 6,366,973 B1 | | 4/2002 | Lo et al. | 710/128 |
| 6,425,071 B1 | | 7/2002 | Lo et al. | 712/41 |
| 6,442,642 B1 | * | 8/2002 | Brooks | 710/305 |
| 6,496,934 B2 | * | 12/2002 | Suzuki et al. | 713/200 |
| 6,526,470 B1 | * | 2/2003 | Cress et al. | 710/307 |
| 6,772,311 B2 | * | 8/2004 | Deng | 711/168 |
| 6,816,921 B2 | * | 11/2004 | Jahnke et al. | 710/22 |
| 6,829,669 B2 | * | 12/2004 | Jahnke et al. | 710/306 |
| 2002/0093504 A1 | * | 7/2002 | Pether et al. | 345/522 |
| 2003/0018837 A1 | * | 1/2003 | Hussain et al. | 710/22 |
| 2003/0043790 A1 | * | 3/2003 | Gutierrez | 370/362 |

OTHER PUBLICATIONS

"AMBA™ Specification (Rev. 2.0)", ARM Limited, Cambridge, England, Chapters 3 and 4, pp. ii-vi, 3-1-3-58 and 4-1-74 (May 13, 1999).

* cited by examiner

*Primary Examiner*—Glenn A. Auve
*Assistant Examiner*—Christopher E. Lee
(74) *Attorney, Agent, or Firm*—Westman, Champlin & Kelly, P.A.

(57) ABSTRACT

A data bus system transfers words and word portions on a data bus between master devices and slave devices. A size bus carries a size code in fixed-byte format that identifies a number of bytes being transferred in one or more words and/or word portions of a transaction. A byte-enable bus carries a byte-enable code that identifies valid bytes of a word. An interface decodes the byte-enable codes to size codes and, where an odd-byte byte-enable code is decoded, it decodes the odd-byte byte-enable code to a plurality of size codes.

19 Claims, 5 Drawing Sheets

BYTE-ENABLED TRANSFER FOR A DATA BUS HAVING FIXED-BYTE DATA TRANSFER

FIELD OF THE INVENTION

This invention relates to data buses, and particularly to controls for data buses used in integrated circuit chips and the like.

BACKGROUND OF THE INVENTION

Data buses are used in integrated circuits (ICs) to transfer data between master devices, such as user-controlled microprocessors, and slave devices controlling peripheral devices, such as memories and the like. One such bus design is an Advanced High-performance Bus (AHB) from ARM Limited of Cambridge, England. The AHB bus design is a form of an Advanced Microcontroller Bus Architecture (AMBA) bus. The AHB bus provides high performance, high clock frequency data transfer between multiple bus master devices and multiple bus slave devices through use of an arbiter. The AHB bus is particularly useful in integrated circuit chips, including single chip processors, to couple processors to on-chip memories and to off-chip external memory interfaces.

The AHB bus is a pipelined bus that operates in two phases, a command phase followed by a data transfer phase. The master device instructs, or commands, the slave device during the command phase to perform a specific type of data transaction, and the slave device transfers data with the master device during the data transfer phase. For example, a read command will command the slave to read data from its storage device and transfer that data to the master device via the data bus during the data transfer phase. A write command will command the slave to receive data from the master device during the data transfer phase for storage within the storage device. A typical AHB bus includes a 32-bit data bus to transfer up to four 8-bit bytes during a single beat. Other AHB bus configurations exist for buses capable of handling 1024 bits (128 bytes) during a single beat.

In the AHB bus, a write command is accompanied by an address in the peripheral device to which data are to be written, as well as a fixed-byte data transfer format, known as a Legacy format, that includes burst information (called HBURST) identifying the number of beats and burst type, and size information (called HSIZE) identifying the size (number of bytes) of the transfer. Master and slave devices operating on the Legacy format are known as Legacy devices. Each byte of data is written to a location in the storage device designated by an address. The addresses of successive bytes of data are calculated from an address of a first byte using the HBURST and HSIZE information. In the Legacy format, the size information is limited by the number of bits in the HSIZE code. The HSIZE data is 3 bits, representing eight combinations that define eight pre-defined sizes of transfer: 1, 2, 4, 8, 16, 32, 64 and 128 bytes to be transferred during the beats specified by the HBURST code.

As used herein, a "fixed-byte" format is a transfer format in which a prescribed number of bytes is transferred during a given transaction. Thus, the Legacy format is a "fixed-byte" format because each transaction is limited to transfer of one of the eight pre-defined number of bytes. The term "odd-byte" refers to a number of bytes that is not the same as a number of bytes prescribed by a pre-defined transfer size of the bus transfer format. Stated another way, an odd-byte format is any format that is not a fixed-byte format.

To transfer a group of data bytes that is not equal to the number of bytes prescribed by one of the eight pre-defined sizes of data transfer (i.e., an odd-byte transfer), the AHB bus is required to perform several independent transactions. For example, in the AHB bus it is not possible to perform a 3-byte transfer as a single transaction. Instead, a 3-byte transfer is performed by two transactions: a 2-byte transfer and a 1-byte transfer, or vice versa.

Data buses exist that permit transfer of various sized data bursts using byte-enabled formats, and master and slave devices are available for such buses to perform byte-enabled transfers. A byte-enabled transfer is accomplished with a byte-enable code associated with each beat of data transfer to identify the validity of each byte in the beat. For example, if a bus contains 32 data lines, carrying four 8-bit bytes, a 4-bit byte-enable code indicates which bytes are valid and which are invalid. Consequently, a 3-byte transfer can be accomplished simply by indicating which three bytes of the transfer are valid using the 4-bit byte-enable code. However, buses employing fixed-byte formats, such as the AHB bus, cannot accommodate byte-enable devices because these buses cannot handle odd-byte formats.

It is desirable to couple devices that operate in a byte-enable transfer format to a bus that operates in a fixed-byte data format. One attempt is found in the Lo et al. U.S. Pat. No. 6,366,973, where an interface circuit is provided for byte-enable slave devices to permit fixed-byte master devices to transfer data with the byte-enable slave device. Lo proposes an interface circuit that translates transfer codes associated with fixed-byte format transfers of an Advanced System Bus (ASB) to a PCI format, a form of byte-enable transfer, and to translate transfer codes associated with certain byte-enable transfers to the fixed-byte format. However, the Lo approach cannot translate odd-byte byte-enable transfer formats to the fixed-byte transfer. More particularly, the ASB bus operates in single word transfers of one, two and four bytes. The Lo interface circuit translates the ASB command to byte-enable by setting one, two or four bits of the byte-enable code to indicate valid bytes, and translates the byte-enable transfer code to ASB format by translating byte-enable codes that contain one validity bit, two consecutive validity bits and four validity bits to the corresponding ASB code. The Lo interface circuit cannot handle odd-byte transfers of three bytes or of two non-consecutive bytes.

The ASB bus is a single word transfer bus, and while it can transfer multiple word bursts, it does not employ burst descriptors as in the AHB bus that specifies the number of beats and burst type. Consequently, the Lo interface circuit will not successfully operate, in a bus environment where plural words are transferred in a single transaction, such as in the AHB bus.

SUMMARY OF THE INVENTION

The present invention is directed to a technique whereby an odd-byte byte-enable transfer may be performed on a bus system having a fixed-byte transfer format, such as in the AHB bus.

In accordance with the present invention, a data bus system transfers words and word portions on a data bus between master devices and slave devices in a fixed-byte data transfer format. One of the master and slave devices operates in a fixed-byte format and the other operates in a byte-enable format. A size bus carries a size code that identifies a number of bytes being transferred in one or more words and/or word portions of a transaction. An interface decodes an odd-byte byte-enable code from the device operating in byte-enable format to a plurality of size codes.

In some embodiments, the master devices do not know the format used by the slave devices. Each master operating in fixed-byte format places a predetermined byte-enable code onto a byte-enable bus indicating that the transfer is in a fixed-byte format. A comparator at each slave device examines the byte-enable code to identify if the transfer is in byte-enable or fixed-byte format. The interface includes a converter coupled to the fixed-byte format slave devices to decode the byte-enable code to one or more fixed-byte codes, depending on the nature of the byte-enable code. A memory stores subsequent fixed-byte codes for subsequent transfers. A second converter is coupled to each byte-enable slave device to decode fixed-byte codes to byte-enable codes. In both cases, the respective interface includes address transformation based on a received address code and the fixed-byte code either received or resulting from decoding the byte-enable code.

In other embodiments, the master devices know the format used by the various slaves and the interfaces perform the transformations at the master devices, rather than the slave devices.

DETAILED DESCRIPTION OF THE PREFERRED EMBODIMENTS

Figure 1:
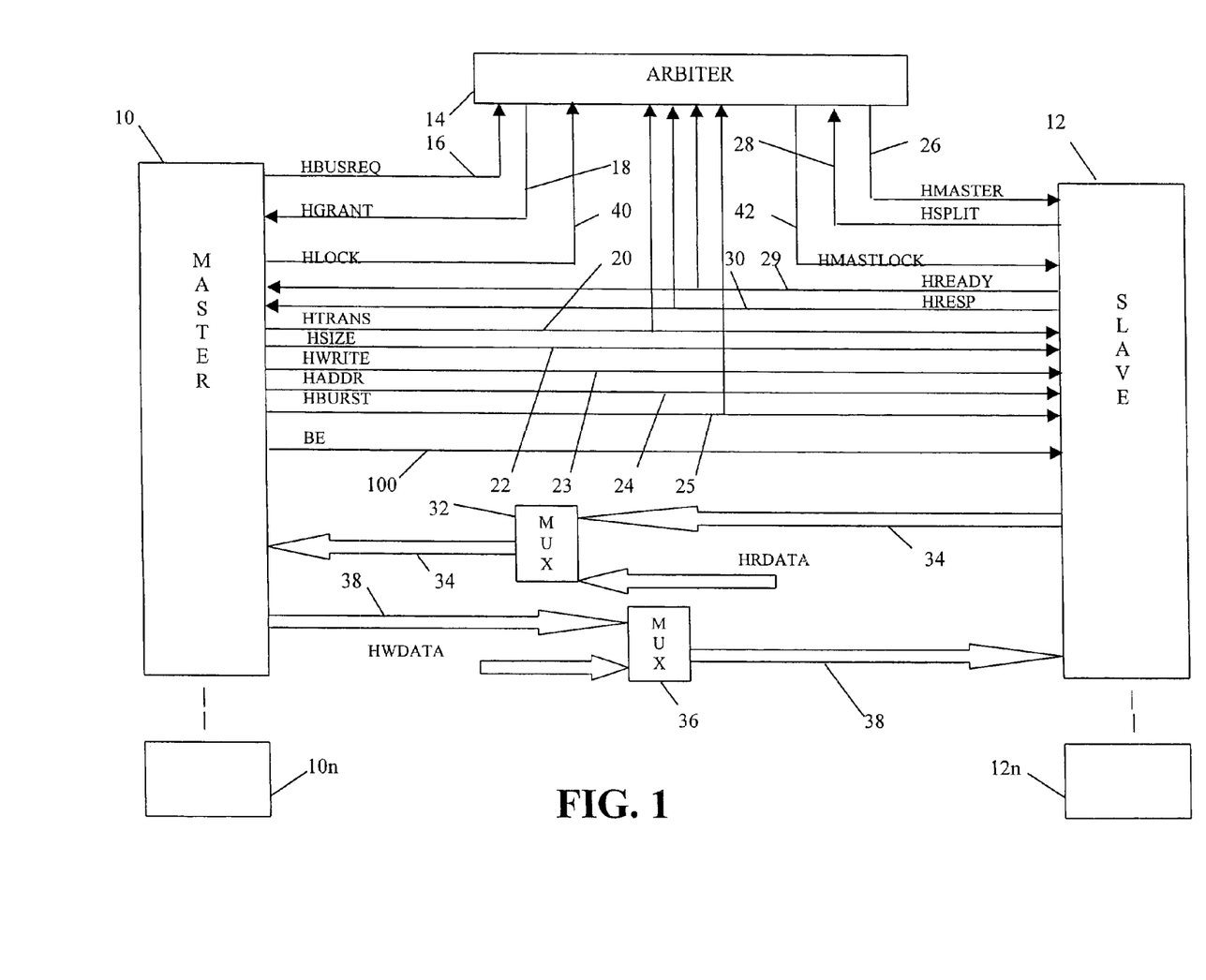
FIG. 1 is a block diagram of portions of an AHB bus composed of master and slave devices operating with fixed-byte transfers and modified to handle byte-enable transfers according to the present invention.

FIG. 1 illustrates portions of an Advanced High-performance Bus (AHB) design of an Advanced Microcontroller Bus Architecture (AMBA) bus, version 2.0, from ARM Limited of Cambridge, England containing features of the present invention. A more detailed description of the AHB bus design may be found in *AMBA Specification* published by ARM Limited (1999), and particularly Chapter 3 thereof (pp. 3-1 to 3-58), incorporated herein by reference. This bus provides high performance, high clock frequency transfer between multiple bus master devices 10, 10a, etc. and multiple bus slave devices 12, 12a, etc., and is particularly useful in microprocessor chips, including single chip processors.

A master device 10 is a device that is capable of initiating a data transfer with a slave device 12 by providing address and control information. Examples of operations requiring data transfer between master and slave devices include read and write operations to read data from, or write data to, a peripheral memory device operated by the slave device. A slave device 12 is a device that responds to a command to perform the data transfer. The slave device provides a return indicating the success, failure or waiting status of the data transfer.

In the bus illustrated in FIG. 1, data transfer operations between the master and slave devices are arbitrated by an arbiter 14, which is a device that ensures that only one master device 10 is allowed to initiate data transfers at a given time. The arbiter operates in accordance with an arbitration protocol that establishes a priority among the master devices, such as by an assigned rank or an allocation scheme based on usage.

The bus illustrated in FIG. 1 transfers data packages in the form of bursts of selected lengths. Each burst contains a plurality of beats of data for transfer and is accompanied by a burst identification code (HBURST) that identifies the number of beats, a size identification code (HSIZE) that identifies the size of the transfer, an address identification (HADDR) that identifies the address in the slave's peripheral device for the data, and other signals dealing with the nature of the transfer.

One feature of the bus illustrated in FIG. 1 is the ability of certain slave devices 12 to initiate a split of a transfer request from a master device 10. More particularly, when a slave device is not ready to respond to the master device command, it may issue a stall or a split. A stall will hold the bus for the transaction with the master device so that no other traffic is permitted. A split will block the master device from the bus and idle the bus so that it becomes available to other master devices.

Another feature of the bus illustrated in FIG. 1 is that the master device 10 may assert an HLOCK code on bus 40 to indicate to arbiter 14 that the master device is performing several indivisible transfers and that the arbiter must not grant any other master device access to the bus once the locked transfer commences. The arbiter indicates that a current transfer is part of a locked sequence by asserting an HMASTLOCK code on bus 42 to slave device 12. The slave device responds to the code on bus 42 to process all locked transfers before any other master device is granted access to the bus.

In operation of the data bus system shown in FIG. 1, arbiter 14 is configured to receive an HBUSREQ signal via an individual line 16 from a respective master device 10, indicating that the respective master device 10 seeks access to the data bus. Arbiter 14 responds to the requests in an order established by its protocol, as modified by any split or retry operation, to issue an HGRANT signal via a respective line 18 to one of the requesting master devices. If, for example, there are sixteen master devices, there will be sixteen HBUSREQ lines 16 on which each respective master device 10 notifies arbiter 14 that the respective master device desires use of the bus and there will be sixteen HGRANT lines 18 on which access is granted. The arbiter protocol grants access to one and only one master device at a time.

When access is granted to a master device 10, the address phase commences with the requesting master device 10 sending each slave device 12 an HTRANS code via bus 20, an HSIZE code via bus 22, an HWRITE signal via bus 23, an HADDR code via bus 24, and a HBURST code via bus 25. The HTRANS and HBURST codes are also sent to arbiter 14. In addition, the master device sends an HLOCK signal to the arbiter. The HWRITE signal is a single bit representing whether the master device is requesting a read or a write operation; the HSIZE code is a 3-bit code representing the size of the transfer; the HADDR code is a code up to 32-bits long from which the address can be identified in a slave device where data are to be read or written; the HTRANS code is a 2-bit code identifying the type of transfer (e.g., sequential, non-sequential, idle or busy); the HBURST code is a 3-bit code identifying the number (or range) of beats (or bus cycles) of a data transfer and whether the beats are wrapped or incremental; and the HLOCK signal is a bit indicating whether or not the master is performing a series of indivisible (locked) transactions.

Arbiter 14 asserts a master identification code, or tag, via HMASTER bus 26 to all slave devices 12 identifying the master device that is using the bus. In the case of a system with sixteen master devices, the HMASTER bus 26 is a 4-line bus and the master identification code is a 4-bit code representing the individual master device. Arbiter 14 also asserts an HMASTLOCK bit 42 indicating that the transfer is or is not part of a locked transaction.

Each master transaction (HTRANS) on bus 20 generates a response from one of the slave devices 12, namely the slave device containing the address where the data are to be read or written. The response appears on buses 29 and 30 as a 1-bit HREADY signal and a 2-bit HRESP code. The HREADY bit indicates whether the slave device can immediately complete the transfer HREADY=1) or whether the slave device needs to extend the data transfer phase (HREADY=0). The slave device may hold HREADY low (HREADY=0) as long as it desires, but arbiter 14 cannot permit any bus traffic as long as HREADY is low. The HRESP code provides an OKAY code (HRESP=0,0) that indicates a transfer was successfully completed (and, as will be explained, is used with the HREADY=0 bit to stall the bus), an error code (HRESP=0,1) to indicate to the master device that an error has occurred, a retry code (HRESP=1,0) to indicate to the master device that it should retry the transfer, or split code (HRESP=1,1) that the slave cannot complete the transfer and arbiter should block the master device from the bus and free the bus for use by other master devices until the slave device indicates it is ready to complete the transfer.

Upon receipt of a command from a master device, the slave device records the bus master number in a master ID queue. If the slave device decides it will handle the transaction it issues an OKAY response (HRESP=0,0) on HRESP bus 30. If the command is a write command, or if it is a read command and the read data are available on HRDATA bus 34, the slave device also asserts a bit on the HREADY bus 29 (HREADY=1) and the transaction is completed. Otherwise, the slave device de-asserts the HREADY bus 30 (HREADY=0) to STALL the bus. When read data become available on HRDATA bus 34, slave device 12 asserts a bit on HREADY bus 29 and the transaction is completed. If the slave device decides it is not ready to handle the transaction, it may issue a SPLIT response (HRESP=1,1, HREADY=1) to arbiter 14, causing the arbiter to mask the master device from the bus and idle the bus. Later, when the slave device becomes free to accept a command, it asserts a bit on HSPLIT bus 28 to unmask the split master device. If the slave decides it wishes to stall the bus, it issues a STALL response (HRESP=0,0, HREADY=0) to arbiter 14, causing the arbiter to hold the bus for the current master device and permit no other traffic on the bus.

As shown in FIG. 1 actual transfer of data is performed directly between the slave device 12 and master device 10. A read transfer occurs when the slave device receives the master identification tag via bus 26 for the master device 10 for which it has retrieved data. At that time, the correct master device 10 has been granted access to the bus and the transfer takes place through multiplexer 32 on 32-bit HRDATA bus 34 to the correct master device. During the transfer, the slave device 12 issues an OKAY response on buses 29 and 30 notifying the arbiter and master device that the transfer has successfully occurred. Similarly, a write transfer occurs when the slave device is ready to receive that to be written, at which time the master device that has been granted access to the bus transfers the data through multiplexer 36 and 32-bit HWDATA bus 38 to the slave device.

The slave device includes data FIFOs that transfer data between the data bus 34 or 38 and the peripheral device operated by the slave's device controller and command FIFO. As noted above, the read and write transactions are two-phase operations, consisting of a command phase and a data transfer phase. In a read operation, the command phase initiates retrieval of data from the peripheral device; the retrieved data are returned to the slave's read data FIFO. Upon return of the data, the slave device either transfers the data to the requesting master device (in the case where the slave device had not split the transaction), or (in the case of a split transaction) it indicates that it is ready to transfer the data, which occurs after the master device re-issues the command. In a write operation, the slave responds to the write command when it is ready to receive the data, and the master device transfers the data upon being re-granted use of the bus.

A burst operation is controlled by the HBURST code on line 25. In the AHB bus, the HBURST code is a 3-bit code identifying the size of the burst and whether the burst is an incrementing or wrapping burst. The burst size may be single length (HBURST=0,0,0), unspecified length (HBURST=0,0,1), or in 4-beat (HBURST=0,1,X), 8-beat (HBURST=1,0,X) or 16-beat (HBURST=1,1,X) bursts. Hence, the fixed-length bursts will accommodate up to 16 4-byte beats (64 bytes) on a 32-bit bus. Incremented bursts (X=1) access sequential locations in the peripheral device and the address of each transfer in the burst is an increment of the previous address. Thus, if a 4-beat incremental burst starts with address 0x38 (in hexadecimal) designated by the HADDR code, the address sequence of the four beats is 0x38, 0x3C, 0x40, 0x44. Wrapping bursts (X=0) wrap the address at the address boundaries. Thus, if a 4-beat wrapping burst that wraps at 16-byte boundaries starts with address 0x38, the address sequence is 0x38, 0x3C, 0x30, 0x34. Only the address of the first byte of transfer is required, as the address of all subsequent bytes can be calculated from the first address and the HBURST and HSIZE information.

The Legacy format of the AHB bus employs the 3-bit HSIZE code to identify the size of the transfer, in number of 8-bit bytes. The transfer size may be one 8-bit byte (HSIZE=0,0,0), a halfword or two bytes (HSIZE=0,0,1), a word or four bytes (HSIZE=0,1,0), eight bytes (HSIZE=0,1,1), a 4-word line or 16 bytes (HSIZE=1,0,0), an 8-word line or 32 bytes (HSIZE=1,0,1), 64 bytes (HSIZE=1,1,0) or 128 bytes (HSIZE=1,1,1).

The problem to which the present invention is directed is that the data transfer size for each transaction is fixed by the HSIZE code. If a master device 10 requires data transfer of a number of bytes other than prescribed by one of the HSIZE codes, it is necessary to perform the transfer using several separate transactions. For example, to transfer three bytes, transactions transferring two bytes (HSIZE=0,0,1) and one byte (HSIZE=0,0,0) are executed separately. To transfer six bytes, it may be necessary to perform separate transactions for four bytes (HBURST=0,0,0, HSIZE=0,1,0) and two bytes (HBURST=0,0,0, HSIZE=0,0,1). A seven byte transfer might require three transactions: four bytes (HBURST=0,0,0, HSIZE=0,1,0), two bytes (HBURST=0,0,0, HSIZE=001) and one byte (HBURST=0,0,0, HSIZE=0,0,0). The problem is the same for larger transfers. A transfer of 35 bytes at incremental addresses would be accomplished by at least three transactions: an 8-beat transfer of 32 bytes (HBURST=1,0,1 and HSIZE=1,0,1) followed by transactions for two and one byte described above. Each transaction requires at least one arbitration of the bus, so the 3-byte and 6-byte transfers each requires at least two arbitrations and the 7-byte transfer requires at least three arbitrations.

The present invention provides byte-enable transfer capabilities to a fixed-byte transfer bus so that byte-enabled master and slave devices can transfer data with fixed-byte slave and master devices. In accordance with the present invention, a byte-enable bus 100 consisting of four lines that transmit a 4-bit byte-enable code is coupled between each master 10 and each slave 12 of the fixed-byte format bus, such as an AHB bus.

Figure 2:
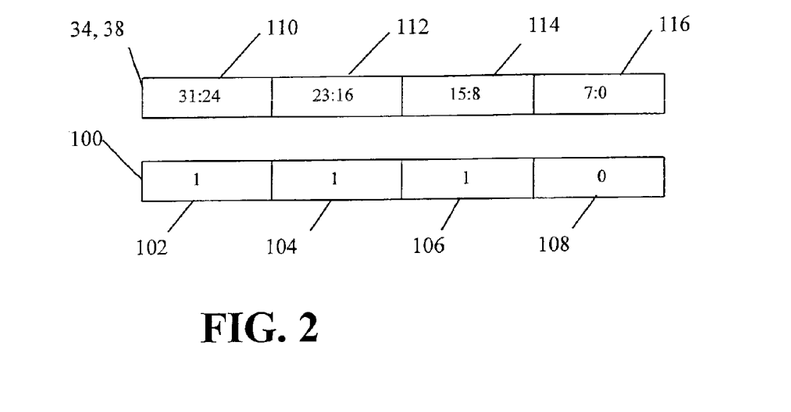
FIG. 2 is a diagram illustrating the principles of a byte-enable transfer format.

As shown in FIG. 2, each bit 102, 104, 106 and 108 of the byte-enable code on bus 100 indicates the validity of a respective byte 110, 112, 114, 116 on the respective HRDATA read data bus 34 or HWDATA write data bus 38. Thus, bit 102 identifies the validity of most significant byte 110 consisting of bits 31:24 on the data bus, bit 104 identifies the validity of byte 112 consisting of bits 23:16 on the data bus, and so on through the four bytes on the 32-bit data bus. (In some conventions, byte 110 is referred to as "byte 0", byte 112 is referred to as "byte 1", etc.) In the example illustrated in FIG. 2, the byte-enable code 1,1,1,0 indicates that the three most significant bytes 110–114 on the data bus, consisting of bits 31:24, 23:16 and 15:8, are valid and that byte 116, consisting of bits 7:0, is invalid. As used herein a "1" bit indicates a byte is valid and a "0" bit indicates that a byte is invalid, although the opposite convention may be employed. Thus, the byte-enable code of 1,1,1,0 on bus 100 will operate a byte-enable slave device receiving the word of data consisting of bytes 110–116 to read or write data (depending on the write command) of bytes 110–114.

Figure 3:
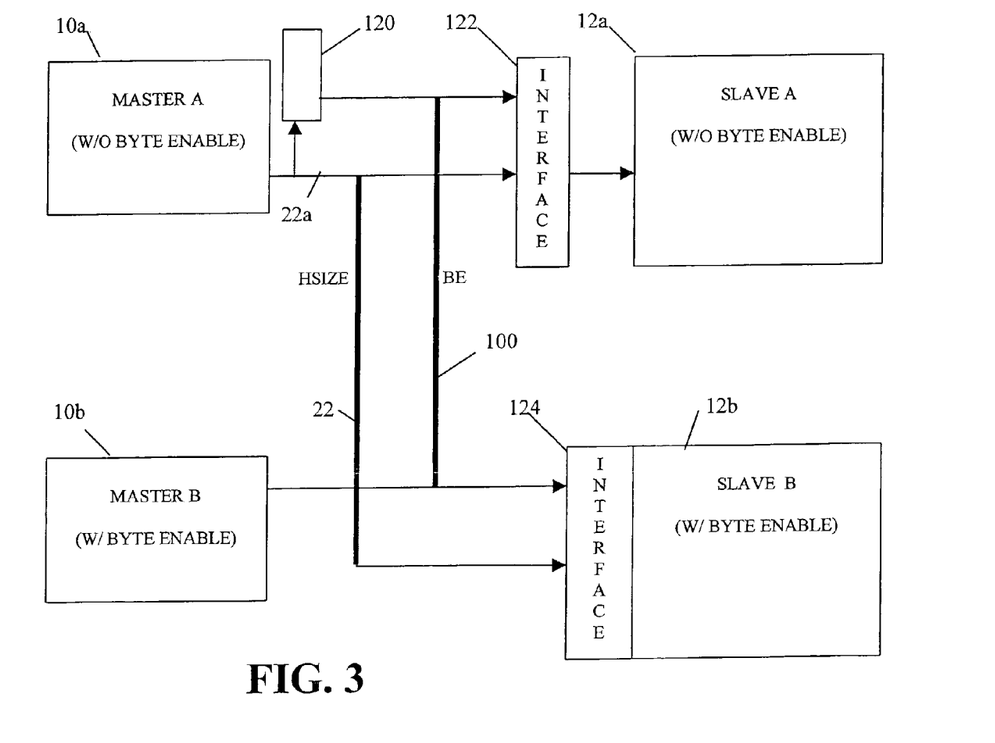
FIG. 3 is a block diagram of the AHB bus illustrated in FIG. 1, illustrating a configuration of master and slave devices operating with byte-enabled and/or fixed-byte transfer formats according to a first embodiment of the present invention.

FIG. 3 is a block diagram of an AHB bus that includes byte-enable transfer capabilities in accordance with one embodiment of the present invention. Master devices 10a are standard Legacy master devices that provide transfer codes in standard AHB Legacy format, previously described. Master devices 10b are byte-enabled devices that provide transfer codes in byte-enabled format. Slave devices 12a are standard Legacy slave devices that operate on standard AHB Legacy format codes and are not compatible to byte-enabled format. Slave devices 12b are byte-enabled devices that operate on byte-enabled format codes and are not compatible to Legacy format.

To perform transactions with a slave device 12a, a master device 10a simply sends the Legacy format codes to the slave device 12a which responds to the Legacy format codes in the usual manner. However, to perform transactions with slave device 12b, master devices 10a include a register 120 that places a 0,0,0,0 code on byte-enable line 100. A 0,0,0,0 byte-enable code indicates to the slave devices that the transaction is initiated in Legacy format using the HSIZE codes and, if necessary, plural transactions to accommodate odd-byte transfers.

Master devices 10b are connected directly to the byte-enable bus 100, but are not necessarily coupled to the HSIZE bus 22. Each slave device 12a, operating in standard Legacy format, includes an interface 122 that is coupled to both the HSIZE bus 22 and byte-enable bus 100 to decode the byte-enable code on bus 100 to Legacy format and to transfer Legacy codes to the slave device 12a. Slave devices 12b include an interface 124 that receives both byte-enable codes on bus 100 and Legacy codes on bus 22 to transfer byte-enable format codes to slave device 12b.

Figure 4:
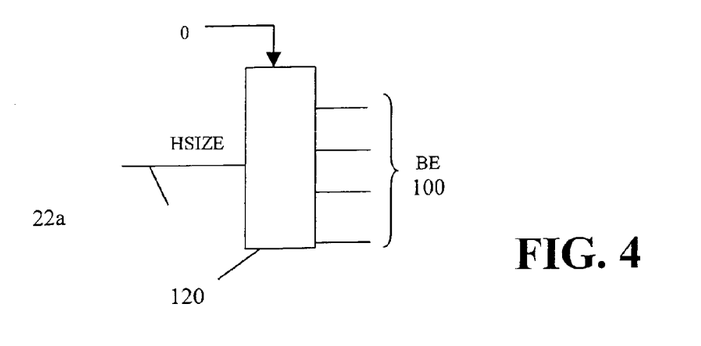
FIGS. 4–6 are functional block diagrams of apparatus used with the master and slave devices illustrated in FIG. 3.

FIG. 4 illustrates register 120 for use with master devices 10a that do not have byte-enable capability. As illustrated in FIG. 2, each bit of the 4-bit byte-enable code 100 indicates the validity of the corresponding byte of data on the corresponding data bus. Thus, a "1" bit in byte-enable code 100 indicates that the corresponding byte of data is valid, a "0" bit indicates that the corresponding byte is invalid. A byte-enable code of 0,0,0,0 would indicate that none of the bytes of the data is valid. In the present invention, a 0,0,0,0 byte-enable code indicates that the byte-enable code is invalid, that the transaction is a Legacy format, and that the HSIZE code is valid. If the byte-enable code is something other than 0,0,0,0 (i.e., contains at least one "1" bit), the byte-enable format is valid and the HSIZE code is invalid.

Register 120 in FIG. 4 is responsive to the master device's HSIZE code to provide a 0,0,0,0 code on byte-enable bus 100. This indicates that master device 10a is conducting the transaction in Legacy format.

Figure 5:
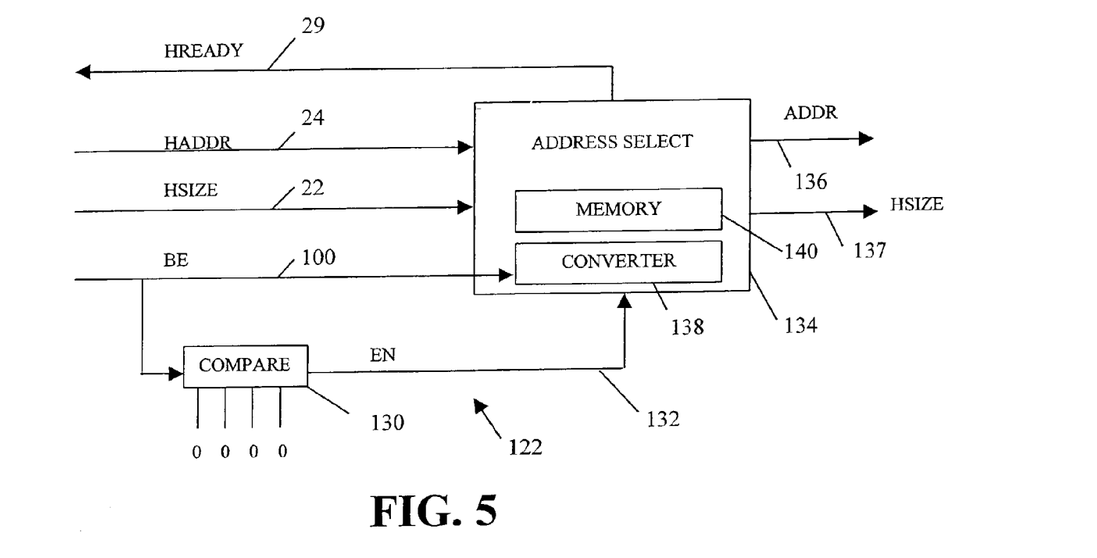

FIG. 5 illustrates an interface 122 useful with slave devices 12a that operate in Legacy format and do not have byte-enable capability. Interface 122 transforms the byte-enable format to Legacy format and passes Legacy format codes to the slave device. Comparator 130 receives the byte-enable codes on bus 100 and compares them to a 0,0,0,0 format to identify whether the transaction is initiated in byte-enable format or Legacy format. Comparator 130 provides an enable signal via line 132 to address select 134. If the enable signal indicates that the format is Legacy format, address HADDR on bus 24 and the HSIZE code on bus 22 are selected and transferred to slave device 12a on buses 136 and 137, respectively.

If the transaction is a byte-enable transaction, the absence of a comparison by comparator 130 enables address select 134 to operate in a byte-enable format. In a read transaction, address select 134 decodes the byte-enable format to a Legacy format and stalls the bus as necessary. More particularly, the byte-enable code is received by converter 138, which selects bytes for retrieval and transfer. Converter 138 examines the byte-enable code. If the byte-enable code contains four validity bits (1,1,1,1), converter 138 generates a 0,1,0 code (corresponding to the equivalent 4-byte HSIZE code), and address select 134 transfers the HADDR code and the HSIZE code to slave device 12a on buses 136 and 136, respectively.

If the byte-enable code contains three validity bits (namely, 0,1,1,1, 1,0,1,1, 1,1,1,0 or 1,1,0,1), converter 138 decodes the two most significant bits of the byte-enable code to an HSIZE code of either 0,0,0 or 0,0,1 (as the case may be) for retrieval and transfer of the one or two bytes indicated as valid by the two most significant bits of the byte-enable code. It is also necessary to convert the HADDR address code for each of the half-word transfers.

In the Legacy format, a transaction to store a word (four bytes) commencing at address 0x38 (in hexadecimal) is performed with HADDR=0x38 for the first byte (byte 0). The slave calculates the address for the successive bytes (to 0x39, 0x3A and 0x3B). A transaction to write a half-word (two bytes) at address 0x3A would be performed with HADDR=0x3A and the slave calculating address 0x3B for the second byte. A transaction to write a single byte at address 0x3B would be performed with HADDR=0x3B.

In the case where three bytes are from a byte-enable master device 10b, the Legacy slave device must transform the address as necessary. For example, if the byte-enable code is 1,1,1,0, address select 134 identifies the "1" bit at the most significant location and passes the HADDR code associated with the most significant byte 0 (e.g., 0x38) to slave device 12a via bus 136. Address select 134 also calculates the HSIZE code 0,1,0 and supplies it via bus 137 to slave device 12a, which in turn calculates the second address (e.g., 0x39) for the second byte (byte 1). Additionally, address select 134 identifies the third bit as "1" and calculates address 0x3A for the byte of the second transfer. The second address, 0x3A, is stored in memory 140. If either the most significant bit or the third bit of the byte-enable code is a "0" (meaning that HSIZE is 0,0,0 to indicate a single byte transfer), address select 134 calculates the HADDR code to match the position of the byte transferred. For example, where the byte-enable code is 0,1,1,1, an HADDR of 0x38 from master device 10b will be transformed to 0x39 for slave device 12a and address 0x3A will be stored in memory 140; for a byte-enable code of 1,1,0,1, address 0x38 will be forwarded to slave device, and address 0x3B will be stored in memory 140.

If the byte-enable code includes two validity bits, converter 138 decodes the byte-enable code to identify if the validity bits are contiguous (e.g., 1,1,0,0, 0,1,1,0, or 0,0,1,1), and provides a 0,0,1 HSIZE code to slave device 12a via bus 137. Address select 134 calculates the correct address from the transferred HADDR code, based on the position of the validity bits in the byte-enable code. In the case where the two validity bits are not contiguous (e.g., 1,0,1,0, 1,0,0,1, or 0,1,0,1), the converter decodes the byte-enable code as two single-byte transfers and provides an HSIZE code of 0,0,0, and stores a copy in memory 140 for the next beat. For each validity bit in the byte-enable code, address select 134 calculates an address from the transferred HADDR code based on the position of the respective validity bit, and issues the address for the corresponding byte to the slave device 12a.

Similarly, if the byte-enable code contains one validity bit, converter 138 decodes the byte-enable code as HSIZE=0,0,0 and address select calculates an address from the transferred HADDR based on the position of the validity bit.

Table I summarizes the operation of address select 134 in transforming the sixteen possible byte-enable codes, each commencing at address 0x38, to one or two fixed-byte formats.

TABLE I

| | First transaction | | Second transaction | |
|---|---|---|---|---|
| BE | HADDR (hex) | HSIZE (binary) | HADDR (hex) | HSIZE (binary) |
| 0,0,0,1 | 0x3B | 0,0,0 | | |
| 0,0,1,0 | 0x3A | 0,0,0 | | |
| 0,0,1,1 | 0x3A | 0,0,1 | | |
| 0,1,0,0 | 0x39 | 0,0,0 | | |
| 0,1,0,1 | 0x39 | 0,0,0 | 0x3B | 0,0,0 |
| 0,1,1,0 | 0x39 | 0,0,0 | 0x3A | 0,0,0 |
| 0,1,1,1 | 0x39 | 0,0,0 | 0x3A | 0,0,1 |
| 1,0,0,0 | 0x38 | 0,0,0 | | |
| 1,0,0,1 | 0x38 | 0,0,0 | 0x3B | 0,0,0 |
| 1,0,1,0 | 0x38 | 0,0,0 | 0x3A | 0,0,0 |
| 1,0,1,1 | 0x38 | 0,0,0 | 0x3A | 0,0,1 |
| 1,1,0,0 | 0x38 | 0,0,1 | | |
| 1,1,0,1 | 0x38 | 0,0,1 | 0x3B | 0,0,0 |
| 1,1,1,0 | 0x38 | 0,0,1 | 0x3A | 0,0,0 |
| 1,1,1,1 | 0x38 | 0,1,0 | | |

Table I identifies the byte-enable and HSIZE codes in binary and the HADDR code in hexadecimal. As shown in Table I, two transactions are required for the three-byte transfers and those two-byte transfers where the bytes do not have consecutive addresses, herein called "odd-byte combinations". These are odd-byte combinations previously described and are transferred by the apparatus of FIG. 5 by converting the odd-byte transfer to two Legacy transactions.

(Those familiar with the AHB format will recognize the above description as associated with the AHB system known as "big endian". Because the word structure and address scheme is slightly different in the AHB system known as "little endian", the HSIZE and HADDR codes will be slightly different in "little endian" AHB systems.)

Where a byte-enable transfer is divided into two or more Legacy transactions, as in the case of three-byte and certain two-byte transfers previously described, if the slave device decides it can handle the transaction, address select 134 is operated to de-assert (set to 0) the HREADY bit on line 29, thereby issuing a STALL to the bus until completion of the second data transfer phase of the transaction. If the slave decides it cannot handle the transaction, it issues a SPLIT by asserting the HREADY bit (HREADY=1) and issuing a SPLIT on the HRESP bus (HRESP=1,1). In either case, after completion of the first transfer (for the most significant half-word), the HSIZE and HADDR codes stored in memory 140 are readied for transfer to slave device 12a. Upon transfer of all bytes, address select 134 asserts the HREADY bit to indicate successful transfer of the read data.

A write transaction of a byte-enable format transfer with slave device 12a is similar to the read transaction. Converter 134 decodes the byte-enable code to one or two HSIZE codes, as described above, and operates address select to calculate an address from the transferred HADDR code, based on the position of the validity bits in the byte-enable code, where data is to be written in the peripheral device associated with slave device 12a. Memory 140 stores the second HSIZE code, in those cases where a second HSIZE code is generated, to write any second beat of data.

Figure 6:
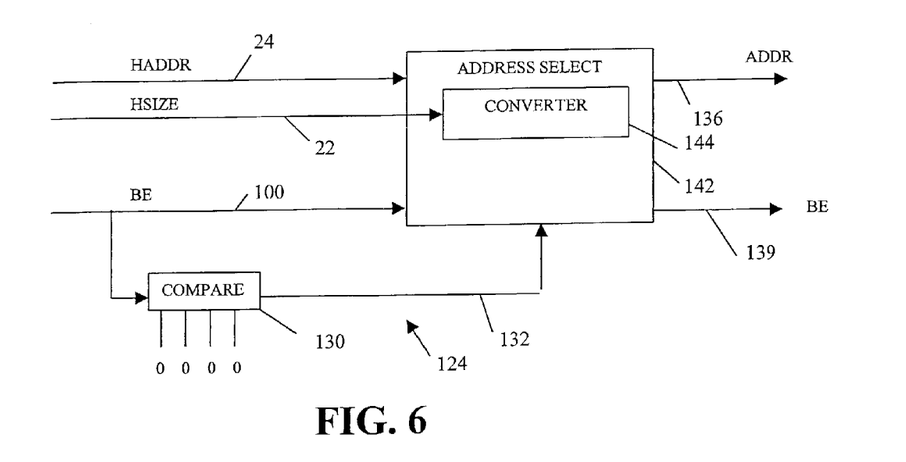

FIG. 6 illustrates an interface 124 used with slave devices 12b that have byte-enable capability. As in the case of interface 122 illustrated in FIG. 5, comparator 130 identifies whether the input transaction is in byte-enable format or Legacy format and supplies an enable signal to address select 140. If the input transaction is in byte-enable format, address select 140 identifies the address from the HADDR bus 24 in the standard byte-enable format and passes the address and byte-enable codes to slave device 12b via buses 136 and 139.

If the input transaction is in Legacy format, the HSIZE code is decoded by converter 142 to the byte-enable format and address select 144 selects the position(s) of the validity bits in the byte-enable code to supply to slave device 12b via bus 139 based on the HSIZE and HADDR codes and selects the HADDR address as the word boundary. More particularly, if HSIZE=0,0,0, converter 142 decodes HSIZE=0,0,0 to a 4-bit byte-enable code and address select selects the position of a "1" validity bit based on the address on HADDR. The HADDR code transferred from master device 10a is transformed to the address corresponding to the position of the validity bit and passed to slave device 12b via bus 136. If HSIZE=0,0,1, address select selects two contiguous positions for validity bits in the byte-enable code, based on the address HADDR. If HSIZE=0,1,0, converter 142 simply decodes the HSIZE code to a byte-enable code of 1,1,1,1 and passes the original HADDR. (The Legacy format has no HSIZE code corresponding to a three-byteenable code. Consequently, if a Legacy master device 10*a* wishes to conduct a three-byte transaction with slave device 12*b*, it will do so in two transactions, such as a two-byte transaction where HSIZE=0,0,1 and a one-byte transaction where HSIZE=0,0,0.)

Table II summarizes the operation of address select 140 in response to the eight possible combinations of HADDR codes and HISZE codes for one-, two- and four-byte transfers. In table II, the byte-enable and HSIZE codes are given in binary and the HADDR code is given in hexadecimal. Also, it is assumed that the HADDR code associated with the byte-enable code is 0x38 in each case.

TABLE II

| Legacy | | Byte-Enable | |
|---|---|---|---|
| HSIZE | HADDR | BE | HADDR |
| 0,0,0 | 0x38 | 1,0,0,0 | 0x38 |
| 0,0,0 | 0x39 | 0,1,0,0 | 0x38 |
| 0,0,0 | 0x3A | 0,0,1,0 | 0x38 |
| 0,0,0 | 0x3B | 0,0,0,1 | 0x38 |
| 0,0,1 | 0x38 | 1,1,0,0 | 0x38 |
| 0,0,1 | 0x39 | 0,1,1,0 | 0x38 |
| 0,0,1 | 0x3A | 0,0,1,1 | 0x38 |
| 0,1,0 | 0x38 | 1,1,1,1 | 0x38 |

Figure 7:
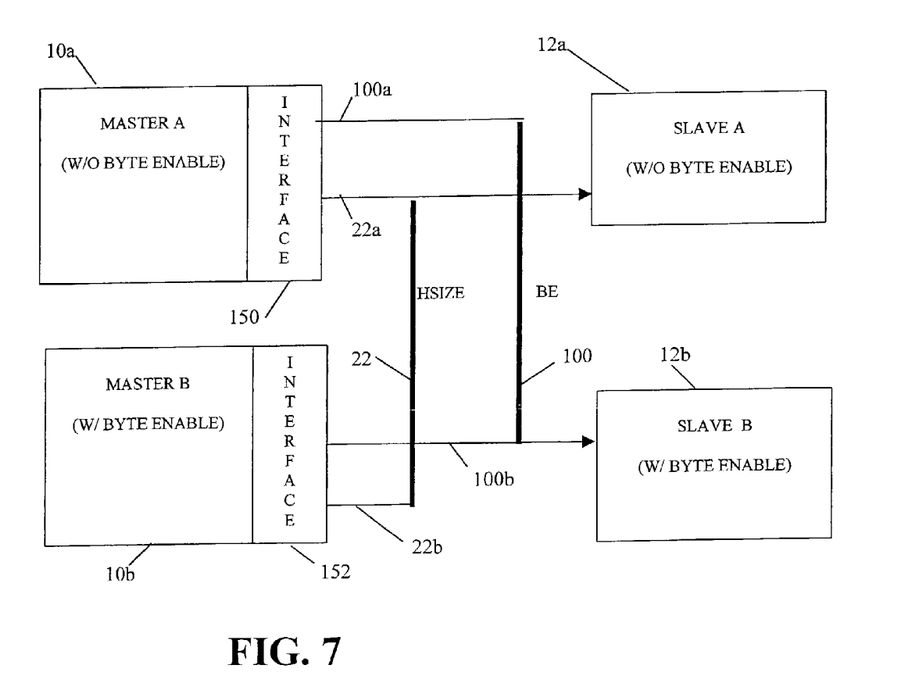
FIG. 7 is a block diagram of the AHB bus illustrating a configuration of master and slave devices operating with byte-enabled and/or fixed-byte transfer formats according to a second embodiment of the present invention.

The bus system shown and described in FIGS. 3–6 operates on the assumption that the master devices 10*a* and 10*b* do not know whether a given slave device 12*a* or 12*b* is a Legacy or byte-enable format slave. Consequently, each master device 10*a* and 10*b* simply operates in its native format, and the interface associated with each slave device converts the master's format to the slave's native format, if different. If the masters know the format used by the slaves, the configuration can be slightly different, and simpler. More particularly, if each master device included a local memory containing a table that identifies the data transfer format used by each slave, an interface associated with the master device can convert the transfer format from that of the master to that of the slave with which the master is attempting to communicate, if different. Each master would be coupled to both the HSIZE and BE buses, but each slave would be coupled only to the bus of the slave's format. Such a system is illustrated in FIG. 7 where Legacy master devices 10*a* are coupled though interface 150 to both the HSIZE bus 22 and BE bus 100 and byte-enable master devices 10*b* are coupled through interface 152 to both the HSIZE bus 22 and BE bus 100. Legacy slave devices 12*a* are coupled only to HSIZE bus 22 and byte-enable slave devices 12*b* are coupled only to BE bus 100. Thus, interface 150 converts the Legacy format to byte-enable format, and interface 152 converts the byte-enable format to Legacy format.

Figure 8:
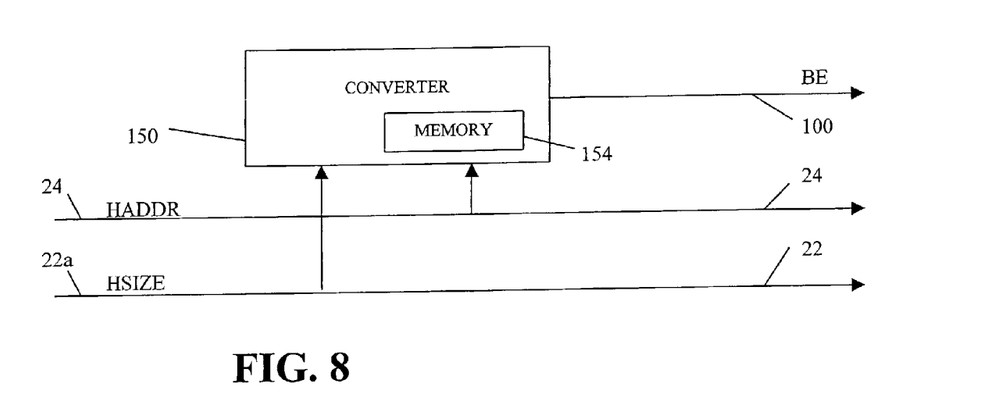
FIGS. 8 and 9 are functional block diagrams of apparatus used with the master devices illustrated in FIG. 7.

FIG. 8 illustrates an interface 150 for a Legacy master device 10*a*. The interface includes a memory 154 containing a list (table) identifying the slave devices 12*a* that are Legacy slave devices and/or slave devices 12*b* that are byte-enable slave devices. Memory 154 is responsive to the address on HADDR bus 24 to provide an enable signal to interface 150 indicative that the address is an address of a byte-enabled slave device. Interface 150 is responsive to the enable signal indicating that the address is of a byte-enable slave device to decode the address on HADDR bus 24 and the HSIZE code on bus 22*a* to a byte-enable code and supplies the byte-enable code on BE bus 100 to slave device 12*b*. More particularly, interface 150 will decode an HSIZE code and HADDR code in the manner shown in Table II.

If the address on the HADDR bus 24 indicates that the slave device with which master device 10*a* desires to communicate is a Legacy slave device 12*a*, the interface is disabled and the HSIZE code on bus 22 operates on the slave device 12*a*.

Figure 9:
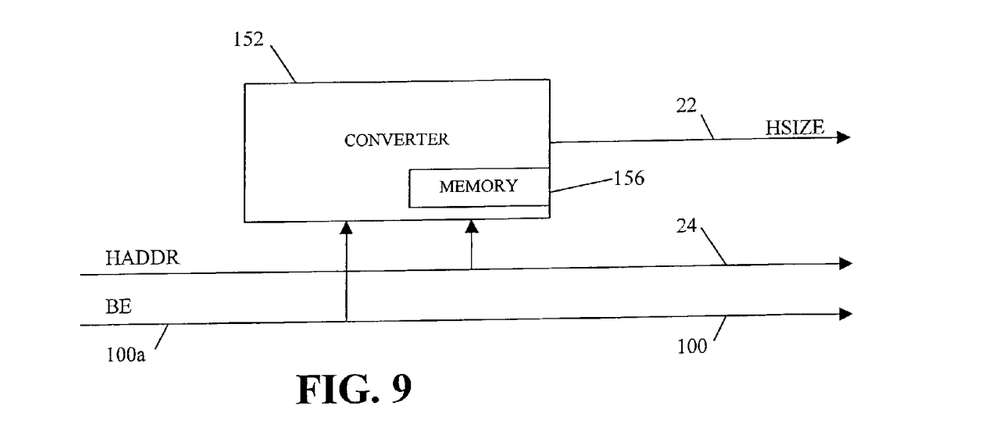

Interface 152 illustrated in FIG. 9 decodes a byte-enable code to one or more Legacy codes. Memory 156 contains a table identifying slave devices 12*a* operating in Legacy format and/or the slave devices 12*b* operating in byte-enable format. Upon receipt of an address on HADDR bus 24 indicative of a slave device 12*a*, memory 156 enables converter 152 to decode the byte-enable code on bus 100*a* to an HSIZE code on bus 22, and transforms the HADDR address code as shown in Table I.

The present invention thus provides interfaces that permit data transfer between devices that operate on byte-enabled formats and devices that operate on a fixed-byte format, such as the Legacy format found in the AHB bus. Consequently, byte-enable devices can communicate odd-byte combinations with fixed-byte devices as well as with other byte-enable devices, and vice versa. As a result, greater flexibility and more computing power can be added to a fixed-byte format bus system without affecting the existing operations on the bus system and without significant expenditure.

Although the present invention has been described with reference to preferred embodiments, workers skilled in the art will recognize that changes may be made in form and detail without departing from the spirit and scope of the invention.

What is claimed is:

1. A data transfer system comprising:
    a data bus operating in a fixed-byte data transfer format to transfer a plurality of words in successive plural transfers of a single transaction, each word containing a predetermined number of bytes;
    a master device and a slave device coupled to the data bus, one of the master and slave devices operating in the fixed-byte transfer format to transfer words and word portions on the data bus between the master and slave devices in either even-byte combinations or in even-byte and single-byte combinations, the other of the master and slave devices operating in a byte-enable data transfer format to transfer words on the data bus between the master and slave devices in byte combinations that includes odd-byte combinations;
    a size bus coupled between the master and slave devices to carry a size code that identifies a number of bytes being transferred in each transfer of the transaction; and
    an interface responsive to an odd-byte byte-enable code from the other of the master and slave devices to decode odd-byte byte-enable codes representing a plurality of bytes to a plurality of size codes associated to respective transfers of the transaction, wherein the interface permits transfer of the odd-byte byte-enable code from the byte-enable data transfer format in the fixed-byte data transfer format as successive plural transfers of the single transaction.

2. The data transfer system of claim 1, wherein the master device operates to transfer data in the byte-enable format and the slave device operates to transfer data in the fixed-byte format, and, the system further includes a byte-enable bus between the master and slave devices to carry the byte-enable code, wherein the interface is at the slave device and includes:
    an address select responsive to a byte-enable code on the byte-enable bus to decode the received byte-enable code to one or a plurality of size codes, and a memory responsive to the address select decoding the byte-enable code to a plurality of size codes to store size codes.

3. The data transfer system of claim 2, further including an address bus coupled between the master and slave devices to carry an address code identifying an address in the slave device associated with at least one valid data byte, the address select being responsive to the address code and the size code decoded from the byte-enable code to provide an address to the slave device for a byte identified by the size code.

4. The data transfer system of claim 3, wherein the address select is responsive to the memory storing size codes to selectively stall the data bus system.

5. The data transfer system of claim 3, wherein the address select is responsive to the memory storing size codes to selectively stall or split the data bus system.

6. The data transfer system of claim 2, further including a second master device operable to transfer data in the fixed-byte format, and further including:
   a register at the second master device coupled to the byte-enable bus, the register being responsive to a size code from the second master device to place a predetermined byte-enable code on the byte-enable bus, and
the interface further including:
   a comparator responsive to the predetermined byte-enable code from the second master device to operate the address select to selectively supply a size code received from the second master device to the slave device.

7. The data transfer system of claim 1, wherein the master device operates to transfer data in the byte-enable format and the slave device operates to transfer data in the fixed-byte format, and wherein the interface is at the master device and includes:
   a converter responsive to a byte-enable code from the master device to decode the byte-enable code to one or a plurality of size codes, and
   a memory responsive to the converter decoding the byte-enable code to a plurality of size codes to store size codes.

8. The data transfer system of claim 7, further including an address bus coupled between the master and slave devices to carry an address code identifying an address in the slave device associated with at least one valid data byte, the converter being responsive to the address code and the size code decoded from the byte-enable code to provide an address to the slave device for a byte identified by the size code.

9. The data transfer system of claim 8, including a plurality of slave devices, some of which operate in fixed-byte format and some of which operate in byte-enable format, wherein
   the memory contains an identification of the slave devices and is responsive to the address code to enable the converter to selectively supply the size code on the size bus to fixed-byte slave devices or the byte-enable code on the byte-enable bus to byte-enable slave devices.

10. The data transfer system of claim 1, wherein the data bus and size bus are embodied in an integrated circuit.

11. A data transfer system comprising:
   a data bus capable of carrying a word containing a predetermined number of bytes;
   a first master device and a first slave device coupled to the data bus, the first master device and first slave device operating in a fixed-byte data transfer format to transfer words and word portions on the data bus between the first master device and the first slave device, each word transferred in the fixed-byte format containing the predetermined number of bytes in either even-byte combinations or in even-byte and single-byte combinations, and each word portion containing at least one byte of valid data;
   a second master device and a second slave device coupled to the data bus, the second master device and the second slave device operating in a byte-enable data transfer format to transfer words on the data bus between the second master device and the second slave device, each word transferred in the byte-enable format containing the predetermined number of bytes;
   a size bus coupled between the first slave device and the first master device, the first master device placing a size code on the size bus identifying the number of bytes being transferred in one or more words and/or word portions of a fixed-byte transfer;
   a byte-enable bus coupled between the second slave device and the second master device, the second master device issuing a byte-enable code identifying bytes of a word containing valid data, at least some byte-enable codes being odd-byte byte-enable codes; and
   an interface coupled to the byte-enable bus and the size bus to decode odd-byte byte-enable codes representing a plurality of bytes to a plurality of size codes.

12. The data transfer system of claim 11, wherein the byte-enable bus is further coupled to the first slave device and the system further includes an address bus coupled between the master and slave devices to carry an address code identifying an address in the respective slave device associated with at least one valid data byte, wherein the interface comprises, at the first slave device:
   a first address select responsive to the address code and a byte-enable code on the byte-enable bus to decode a received byte-enable code to one or a plurality of size codes, and to provide an address to the slave device for a byte identified by the size code,
   a memory responsive to the address select decoding the byte-enable code to a plurality of size codes to store size codes, and
   a first comparator responsive to a byte-enable code from the second master device to operate the first address select to supply a size code decoded from a byte-enable code received from the second master device to the first slave device.

13. The data transfer system of claim 12, further including a register at the first master device coupled to the byte-enable bus, the register being responsive to a size code from the first master device to place a predetermined byte-enable code on the byte-enable bus,
wherein the first comparator is responsive to the predetermined byte-enable code to operate the address select to supply a size code received from the first master device to the slave device.

14. The data transfer system of claim 11, further including a fixed-byte bus coupled to the second master device and the system further includes an address bus coupled between the master and slave devices to carry an address code identifying an address in the respective slave device associated with at least one valid data byte, wherein the interface comprises, at the second master device:
   a converter responsive to a byte-enable code from the second master device to decode the byte-enable code to one or a plurality of size codes, and
   a memory responsive to the converter decoding the byte-enable code to a plurality of size codes to store size codes.

15. The data transfer system of claim 14, wherein the converter is responsive to the address code and the size code decoded from the byte-enable code to provide an address to the first slave device for a byte identified by the size code.

16. An interface for a master or slave device that operates in a byte-enable format on a data bus system that transfers words and word portions on a data bus between master and slave devices in a fixed-byte data transfer format, the interface comprising:
   an address select operable to decode a byte-enable code representing a plurality of bytes to a plurality of size codes for fixed-byte format; and
   a memory responsive to the address select decoding the byte-enable code to a plurality of size codes to store size codes.

17. The interface of claim 16, wherein the address select is further responsive to an address code associated with the transfer to translate the address code to an address for a byte associated with the size code.

18. The interface of claim 16, wherein the interface is coupled to a slave device operating in the fixed-byte format, and wherein a master device coupled to the data bus system and operating in the fixed-byte format supplies a predetermined byte-enable code to the slave devices coupled to the data bus system, the interface further including:
   a comparator responsive to the predetermined byte-enable code to operate the address select to supply a size code received from the master device to the slave device and responsive to a byte-enable code other than the predetermined byte-enable code to operate the address code to supply a size code decoded from the byte-enable code to the slave device.

19. The interface of claim 16, wherein the interface is coupled to a master device operating in the byte-enable format, wherein the memory contains a table identifying whether a slave device operates in the fixed-byte format or the byte-enable format, the address select being responsive to the memory identifying a slave device operating in the byte-enable format to operate the address select to supply the byte-enable code to the slave device and being responsive to the memory identifying a slave device operation in the fixed-byte format to operate the address select to supply a size code decoded from the byte-enable code to the slave device.

* * * * *